(12) United States Patent
Boyl-Davis et al.

(10) Patent No.: US 7,137,760 B2
(45) Date of Patent: Nov. 21, 2006

(54) METHODS AND APPARATUS FOR MANUFACTURING OPERATIONS USING OPPOSING-FORCE SUPPORT SYSTEMS

(75) Inventors: Theodore M. Boyl-Davis, Snohomish, WA (US); James N. Buttrick, Jr., Seattle, WA (US); Darrell D. Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 310 days.

(21) Appl. No.: 10/606,472

(22) Filed: Jun. 25, 2003

(65) Prior Publication Data

US 2004/0265077 A1   Dec. 30, 2004

(51) Int. Cl.
*B23B 47/00* (2006.01)

(52) U.S. Cl. .................. 408/1 R; 408/76; 408/77; 408/79; 408/88; 408/234; 409/132; 409/178; 74/29; 74/422

(58) Field of Classification Search ............... 408/1 R, 408/76, 77, 78, 79, 88, 234; 409/132, 179, 409/175, 178, 181; 74/29, 30, 422, 457
See application file for complete search history.

(56) References Cited

U.S. PATENT DOCUMENTS

| | | | | |
|---|---|---|---|---|
| 1,676,206 | A | * | 7/1928 | Ratliff ................. 408/237 |
| 1,741,044 | A | * | 12/1929 | Whipple et al. ............. 408/79 |
| 2,151,205 | A | | 3/1939 | Hawn |
| RE21,795 | E | | 5/1941 | Verderber |
| 2,911,860 | A | | 11/1959 | Winslow et al. |
| 2,946,246 | A | | 7/1960 | Allan |
| 2,963,927 | A | * | 12/1960 | Hanger ................. 408/79 |
| 3,348,248 | A | | 10/1967 | Milkert |
| 3,456,738 | A | | 7/1969 | Harry |
| 3,575,364 | A | | 4/1971 | Frederick |
| 3,592,095 | A | | 7/1971 | Passa et al. |
| 3,599,958 | A | | 8/1971 | Schindler |
| 3,627,436 | A | * | 12/1971 | Adams et al. ............... 408/63 |
| 3,633,433 | A | | 1/1972 | Schurch |
| 3,663,115 | A | | 5/1972 | Vindez et al. |
| 3,732,608 | A | | 5/1973 | Knopf |
| 3,874,244 | A | | 4/1975 | Rasmussen et al. |
| 3,935,985 | A | | 2/1976 | Prudhomme et al. |
| 3,990,689 | A | | 11/1976 | Eklund, Sr. |
| 4,031,931 | A | | 6/1977 | Balcombe |
| 4,091,712 | A | | 5/1978 | Geiger |
| 4,123,187 | A | | 10/1978 | Turner |
| 4,149,822 | A | | 4/1979 | Lehmkuhl |
| 4,268,949 | A | | 5/1981 | Sato |
| 4,353,308 | A | | 10/1982 | Brown |

(Continued)

FOREIGN PATENT DOCUMENTS

DE          19834702 A1      2/2000

(Continued)

*Primary Examiner*—Monica Carter
*Assistant Examiner*—Michael W. Talbot
(74) *Attorney, Agent, or Firm*—Lee & Hayes, PLLC (57) ABSTRACT

Methods and apparatus for manufacturing operations using opposing-force support systems are disclosed. In one embodiment, an apparatus includes a track assembly adapted to be attached to a workpiece, and a carriage moveably coupled to the track assembly. The carriage includes a tool support adapted to receive and support a manufacturing tool. An opposing-force support assembly is operatively coupled to the carriage and is adapted to be secured to the workpiece. The opposing-force support assembly at least partially counterbalances a manufacturing force exerted on the workpiece by the manufacturing tool.

38 Claims, 7 Drawing Sheets

U.S. PATENT DOCUMENTS

| | | | |
|---|---|---|---|
| 4,388,890 A | 6/1983 | Wester et al. | |
| 4,396,318 A | 8/1983 | Jensen et al. | |
| 4,468,159 A | 8/1984 | Oster | |
| 4,561,814 A * | 12/1985 | Dahlgren et al. | 409/80 |
| 4,570,542 A | 2/1986 | Cable et al. | |
| 4,591,301 A * | 5/1986 | Pelfrey | 408/76 |
| 4,599,018 A * | 7/1986 | Woods | 408/1 R |
| 4,686,397 A | 8/1987 | Becker | |
| 4,720,897 A | 1/1988 | Orrell et al. | |
| 4,740,117 A | 4/1988 | Schaff Deleury et al. | |
| 4,761,876 A | 8/1988 | Kosmowski | |
| 4,778,317 A | 10/1988 | Earle, III et al. | |
| 4,787,786 A | 11/1988 | Freud et al. | |
| 4,850,763 A | 7/1989 | Jack et al. | |
| 4,932,814 A | 6/1990 | York | |
| 4,958,967 A | 9/1990 | Adachi | |
| 5,032,051 A * | 7/1991 | Gilmore | 409/175 |
| 5,062,746 A * | 11/1991 | Deremo | 408/79 |
| 5,072,948 A | 12/1991 | Kostrezewski | |
| 5,173,015 A | 12/1992 | Maynard | |
| 5,297,907 A * | 3/1994 | Strait et al. | 409/238 |
| 5,323,962 A | 6/1994 | Jassby et al. | |
| 5,348,429 A | 9/1994 | Pfister | |
| 5,352,069 A | 10/1994 | Rourke | |
| 5,383,751 A | 1/1995 | Wheetley et al. | |
| 5,390,557 A | 2/1995 | Tsukada | |
| 5,395,187 A | 3/1995 | Slesinski et al. | |
| 5,403,133 A * | 4/1995 | Kim | 409/178 |
| 5,468,099 A | 11/1995 | Wheetley et al. | |
| 5,477,597 A | 12/1995 | Catania et al. | |
| 5,482,411 A | 1/1996 | McGlasson | |
| 5,537,927 A * | 7/1996 | Rogovein et al. | 101/485 |
| 5,542,796 A | 8/1996 | Bratten et al. | |
| 5,573,076 A | 11/1996 | McCannon, Jr. | |
| 5,582,067 A | 12/1996 | Snider | |
| 5,609,444 A * | 3/1997 | Valsecchi | 408/79 |
| 5,661,892 A | 9/1997 | Catania et al. | |
| 5,664,311 A | 9/1997 | Banks et al. | |
| 5,697,413 A | 12/1997 | Fuller | |
| 5,934,848 A | 8/1999 | Hamalainen | |
| 6,007,278 A | 12/1999 | Arsenault | |
| 6,036,409 A | 3/2000 | Rissler | |
| 6,073,326 A | 6/2000 | Banks et al. | |
| 6,210,084 B1 | 4/2001 | Banks et al. | |
| 6,220,099 B1 | 4/2001 | Marti et al. | |
| 6,240,332 B1 | 5/2001 | Buttrick et al. | |
| 6,283,684 B1 | 9/2001 | Jarvis | |
| 6,309,145 B1 | 10/2001 | Tremblay et al. | |
| 6,334,745 B1 * | 1/2002 | Bennett, Sr. | 409/132 |
| 6,357,101 B1 | 3/2002 | Sarh et al. | |
| 6,382,889 B1 * | 5/2002 | Brown et al. | 409/175 |
| 6,413,022 B1 | 7/2002 | Sarh | |
| 6,428,452 B1 | 8/2002 | Dahlstrom et al. | |
| 6,428,453 B1 * | 8/2002 | Hoppe et al. | 483/58 |
| 6,430,796 B1 | 8/2002 | Jones et al. | |
| 6,439,813 B1 | 8/2002 | Repossini | |
| 6,467,385 B1 | 10/2002 | Buttrick et al. | |
| 6,494,307 B1 | 12/2002 | Kozak et al. | |
| 6,505,393 B1 | 1/2003 | Stoewer et al. | |
| 6,547,496 B1 | 4/2003 | Chun et al. | |
| 6,550,129 B1 | 4/2003 | Buttrick, Jr. | |
| 6,612,792 B1 | 9/2003 | Barclay | |
| 6,634,838 B1 * | 10/2003 | Kitamura et al. | 409/235 |
| 6,796,014 B1 | 9/2004 | Sarh | |
| 6,843,328 B1 | 1/2005 | Boyle-Davis et al. | |
| 6,855,099 B1 | 2/2005 | Hazlehurst et al. | |
| 6,902,362 B1 | 6/2005 | Ferrari et al. | |
| 6,926,094 B1 | 8/2005 | Arntson et al. | |
| 2002/0001511 A1 * | 1/2002 | Reguzzi | 408/35 |
| 2002/0127069 A1 | 9/2002 | Luigi | |
| 2002/0168241 A1 * | 11/2002 | David et al. | 409/178 |
| 2003/0207742 A1 | 11/2003 | Hazlehurst et al. | |
| 2004/0076484 A1 * | 4/2004 | Alam et al. | 408/79 |
| 2004/0234352 A1 * | 11/2004 | Vanderpol et al. | 409/178 |
| 2004/0245879 A1 | 12/2004 | Hirzel et al. | |
| 2005/0158134 A1 | 7/2005 | Roders | |

FOREIGN PATENT DOCUMENTS

| | | | |
|---|---|---|---|
| JP | 55120910 A * | 9/1980 | |
| JP | 58028442 A * | 2/1983 | |
| JP | 64-064711 | 3/1989 | |
| JP | 05318218 | 3/1993 | |
| JP | 05-318215 | 12/1993 | |
| JP | 01-210207 | 8/1999 | |

* cited by examiner

METHODS AND APPARATUS FOR MANUFACTURING OPERATIONS USING OPPOSING-FORCE SUPPORT SYSTEMS

CROSS REFERENCE TO RELATED APPLICATIONS

This patent application is related to, commonly-owned U.S. patent application Ser. No. 10/016,524 entitled "Flexible Track Drilling Machine" filed Dec. 10, 2001, and to the following concurrently-filed, commonly-owned U.S. patent applications: "Methods and Apparatus for Counterbalance-Assisted Manufacturing Operations" bearing patent application Ser. No. 10/606,443 "Methods and Apparatus for Track Members Having a Neutral-Axis Rack" bearing patent application Ser. No. 10/606,625 "Apparatus and Methods for Manufacturing Operations Using Non-Contact Position Sensing" bearing patent application Ser. No. 10/606,473 and "Apparatus and Methods for Servo-Controlled Manufacturing Operations" bearing patent application Ser. No. 10/606,402.

FIELD OF THE INVENTION

The present disclosure relates to methods and apparatus for manufacturing operations using opposing-force support systems, and more specifically, to methods and apparatus for drilling operations on aircraft fuselage sections using adjacent hole clamp-up systems.

BACKGROUND OF THE INVENTION

The fabrication of large structures may involve the drilling of a large number of holes in the components of the structure. Conventional structures that require a large number of drilling operations include, for example, aircraft, missiles, ships, railcars, sheet metal buildings, and other similar structures. In particular, conventional aircraft fabrication processes typically involve the drilling of a large number of holes in wing sections of the aircraft to allow these sections to be attached to each other and to the airframe.

A variety of devices have been developed to facilitate drilling operations involving the drilling of a large number of holes. For example, U.S. Pat. No. 4,850,763 issued to Jack et al. discloses a drilling system that includes a pair of rails temporarily attached to an aircraft fuselage. A support carriage is slideably coupled to the rails and supports a drill assembly. A template attached to the aircraft fuselage provides an index for the desired locations of the holes that are to be formed in the aircraft fuselage. As the carriage is moved along the rails, a locking mechanism (or trigger) interacts with the template to securely position the carriage for a subsequent drilling operation.

Although desirable results have been achieved using the prior art drilling systems, some disadvantages have been noted. For example, the performance of prior art drill assemblies may be reduced when operating on relatively lighter, more flexible structures. In such cases, drill thrust may become too high and may cause undesirable bending or structural deflection of the workpiece, which may in turn result in reduced hole quality. Also, on such relatively light, flexible structures, the forces applied by the drilling system on the structure may require careful control to avoid over-exertion against the structure. This may slow the manufacturing operation and reduce throughput. For the foregoing reasons, an unmet need exists for an improved support assembly for performing manufacturing operations, including drilling operations.

SUMMARY OF THE INVENTION

The present invention is directed to apparatus and methods for manufacturing operations using opposing-force support systems, and more specifically, to methods and apparatus for drilling operations on aircraft fuselage sections using hole clamp-up systems. Apparatus and methods in accordance with the present invention may advantageously prevent deflections of a workpiece during a manufacturing operation, thereby improving the accuracy, consistency, efficiency, and throughput of the manufacturing operation.

In one embodiment, an apparatus for supporting a manufacturing tool relative to a workpiece includes a track assembly adapted to be attached to the workpiece, and a carriage moveably coupled to the track assembly. The carriage includes a tool support adapted to receive and support a manufacturing tool. An opposing-force support assembly is operatively coupled to the carriage and is adapted to be secured to the workpiece. The opposing-force support assembly at least partially counterbalances a manufacturing force exerted on the workpiece by the manufacturing tool.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to apparatus and methods for manufacturing operations using opposing-force support systems. Many specific details of certain embodiments of the invention are set forth in the following description and in FIGS. 1–8 to provide a thorough understanding of such embodiments. One skilled in the art, however, will understand that the present invention may have additional embodiments, or that the present invention may be practiced without several of the details described in the following description.

Figure 1:
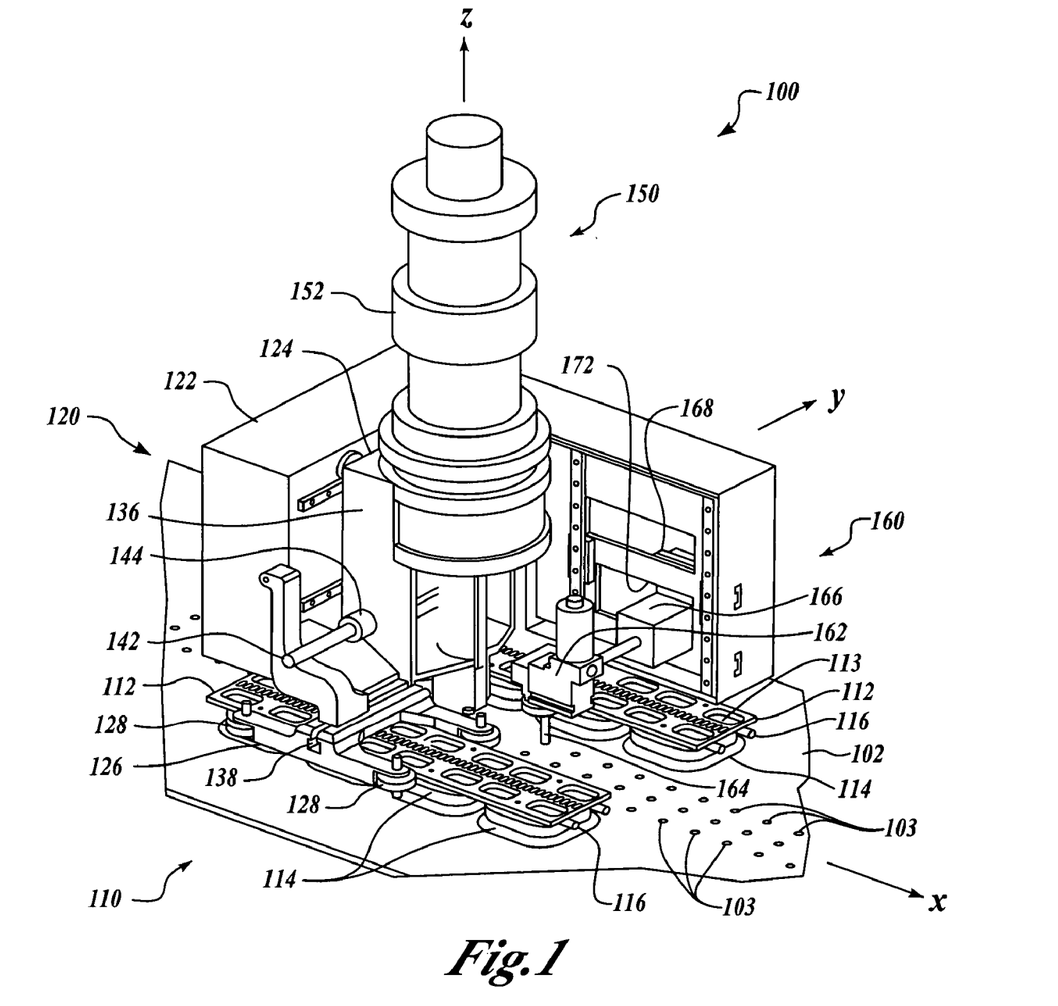
FIG. 1 is a front isometric view of a manufacturing assembly having an opposing-force support assembly for performing manufacturing operations on a workpiece in accordance with an embodiment of the invention.

FIG. 1 is a front isometric view of a manufacturing assembly 100 having an opposing-force support assembly 160 for performing manufacturing operations on a workpiece 102 in accordance with an embodiment of the invention. In this embodiment, the manufacturing assembly 100 includes a track assembly 110 attachable to the workpiece 102, and a carriage assembly 120 moveably coupled to the track assembly 110. A tool assembly 150 (e.g. a drilling assembly) is operatively coupled to the carriage assembly 120 such that the tool assembly 150 may be engaged with the workpiece 102. As shown in FIG. 1, the opposing-force support assembly 160 is coupled to the carriage assembly 120 and is detachably secured to the workpiece 102. Because the opposing-force support assembly 160 may support the workpiece 102 during manufacturing operations, the manufacturing assembly 100 may advantageously reduce or eliminate deflections of the workpiece 102, and may improve the efficiency and quality of the manufacturing operation, as described more fully below.

Figure 2:
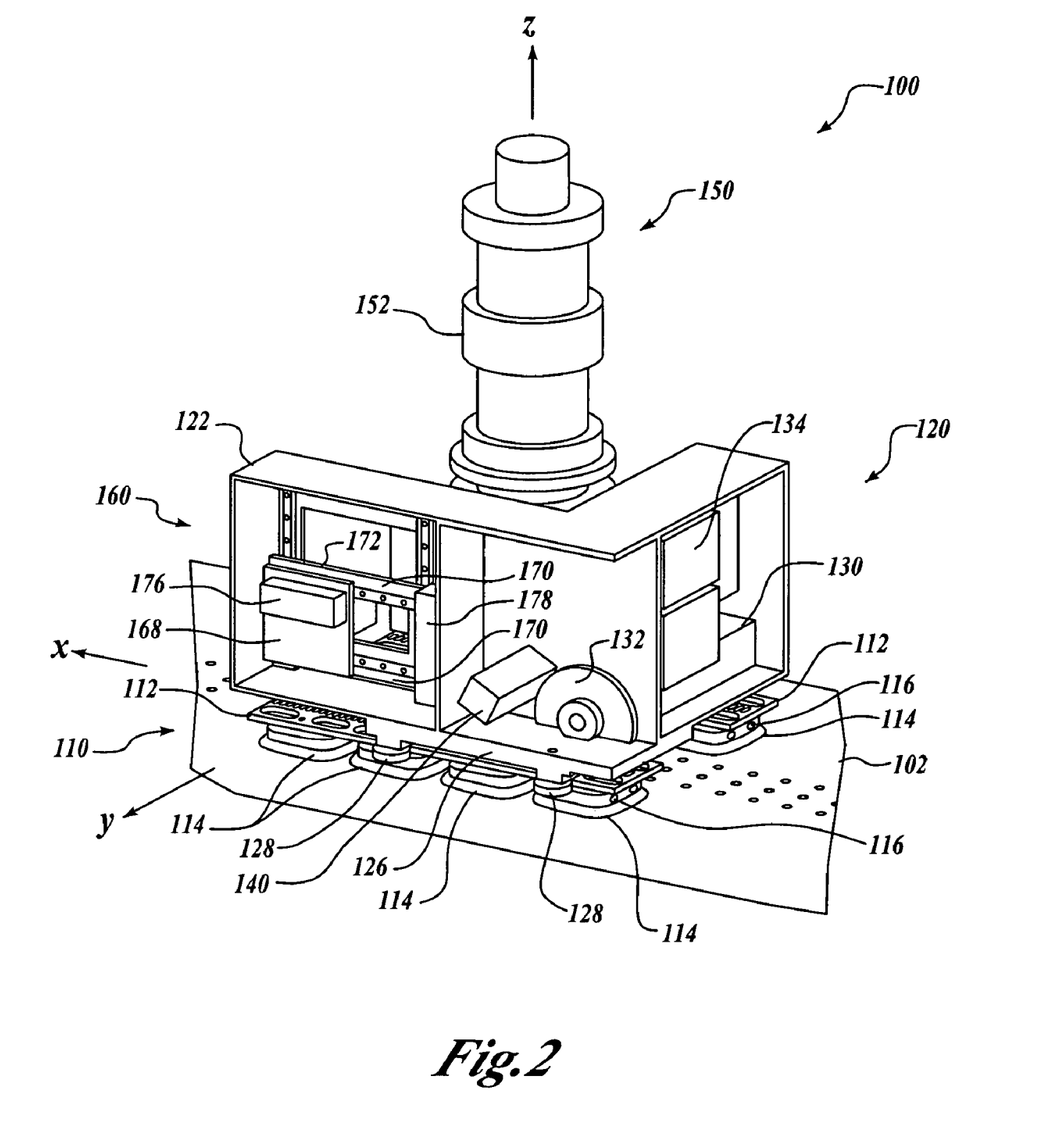
FIG. 2 is a rear isometric view of the manufacturing assembly of FIG. 1.
Figure 3:
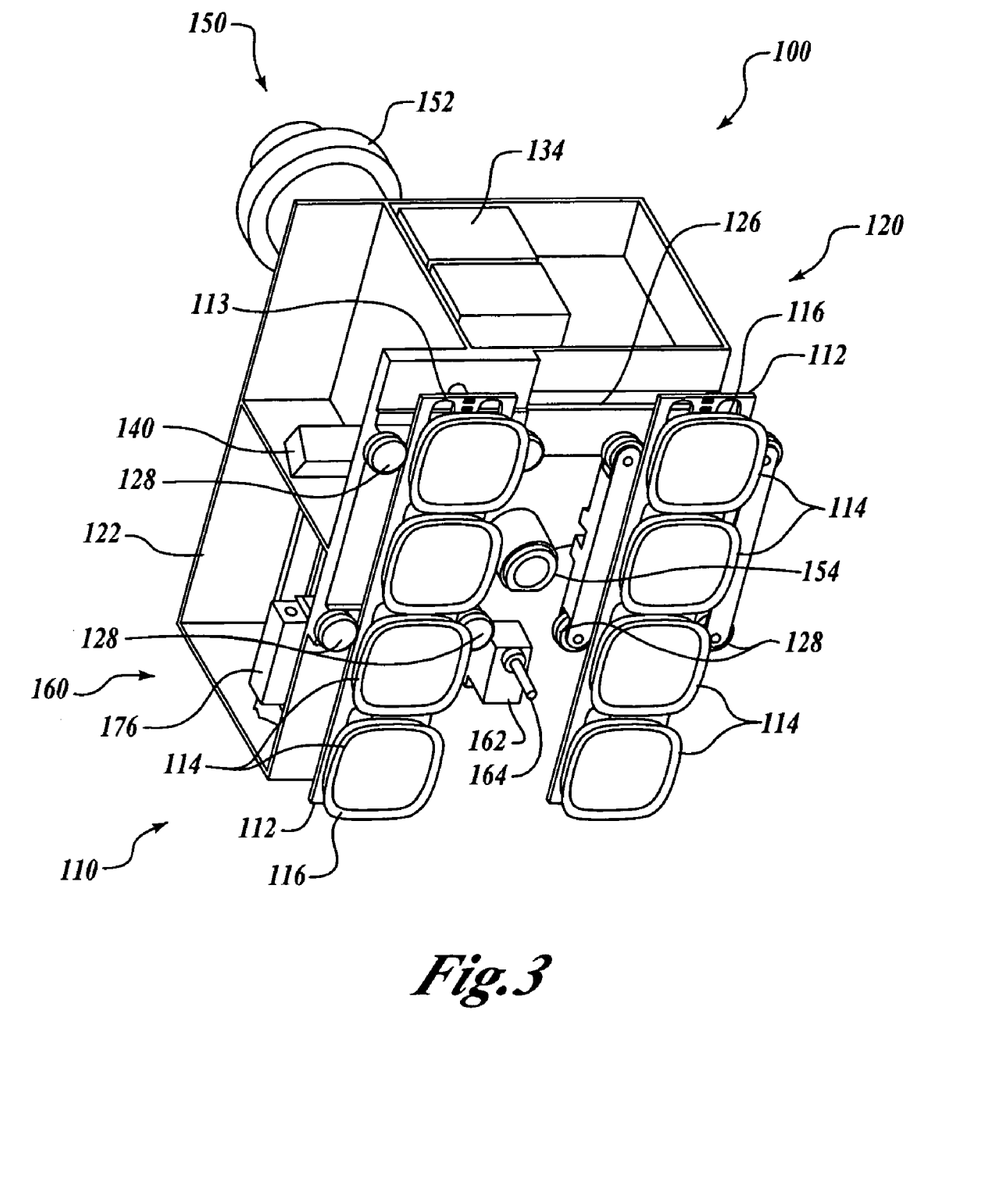
FIG. 3 is a lower isometric view of the manufacturing assembly of FIG. 1.

FIGS. 2 and 3 are rear and lower isometric views, respectively, of the manufacturing assembly 100 of FIG. 1. In this embodiment, the track assembly 110 includes a pair of beams 112, each beam 112 being equipped with a plurality of vacuum cup assemblies 114. The vacuum cup assemblies 114 are fluidly coupled to one or more vacuum lines 116 leading to a vacuum source 118 (not shown), such as a vacuum pump or the like, such that vacuum may be controllably applied to (and removed from) the vacuum cup assemblies 114 during, for example, mounting, re-positioning, and removal of the track assembly 110 to and from the workpiece 102. The vacuum cup assemblies 114 are of known construction and may be of the type disclosed, for example, in U.S. Pat. No. 6,467,385 B1 issued to Buttrick et al., or U.S. Pat. No. 6,210,084 B1 issued to Banks et al. In alternate embodiments, the vacuum cup assemblies 114 may be replaced with other types of attachment assemblies, including magnetic attachment assemblies, bolts or other threaded attachment members, or any other suitable attachment assemblies.

With continued reference to FIGS. 1–3, the carriage assembly 120 includes an x-axis (or first) carriage 122 and a y-axis (or second) carriage 124. The x-axis carriage 122 includes a base member 126 having a plurality of rollers 128 that rollably engage the edges of the beams 112. Thus, the x-axis carriage 122 may translate back and forth along the length of the beams 112 along an x-axis that is aligned with the longitudinal axes of the beams 112. In alternate embodiments, the rollers 128 may be replaced with carriage bearings, gears, slide members, rubber wheels, or other suitable coupling devices. In one particular embodiment, the rollers 128 may be replaced with pinion gears that engage a toothed or serrated rack portion of one or both of the beams 112. As shown in FIG. 2, the x-axis carriage 122 further includes a first drive motor 130 that is operatively coupled to a first gear 132. In this embodiment, the first gear 132 projects through the base member 126 and engages with drive apertures 113 disposed in one of the beams 112. A controller 134 is positioned on the x-axis carriage 122 and is operatively coupled to the first drive motor 130.

Similarly, the y-axis carriage 124 includes a support member 136 slideably coupled to a slot 138 disposed in the base member 126 of the x-axis carriage 122 (FIG. 1). A second drive motor 140 is attached to the x-axis carriage 122 and to the support member 136, and is also operatively coupled to the controller 134. As shown in FIG. 1, in this embodiment, the second drive motor 140 drives a shaft (or screw) 142 that engages a ball nut 144 coupled to the support member 136. Thus, the second drive motor 140 may drive the support member 136 of the y-axis carriage 124 along a y-axis oriented transversely to the x-axis.

As best shown in FIG. 1, the tool assembly 150 is coupled to the support member 136 of the y-axis carriage 124 and may be operatively coupled to the controller 134. In this embodiment, the tool assembly 150 includes a drill spindle module 152 and a pressure foot 154 (FIG. 3) that is controllably engageable with the workpiece 102 during a drilling operation. The drill spindle module 152 is controllably engageable with the workpiece 102 along a z-axis which is approximately aligned with a local normal to the workpiece 102. The drill spindle module 152 may be any known drilling device suitable for performing drilling operations, including, for example, those drilling devices commercially-available from Cooper Tools, Inc. of Lexington, S.C., West Coast Industries, Inc. of Seattle, Wash., Recoules, S.A. of Ozoir-la-Ferriere, France, or from Global Industrial Technologies, Inc. of Dallas, Tex.

Figure 4:
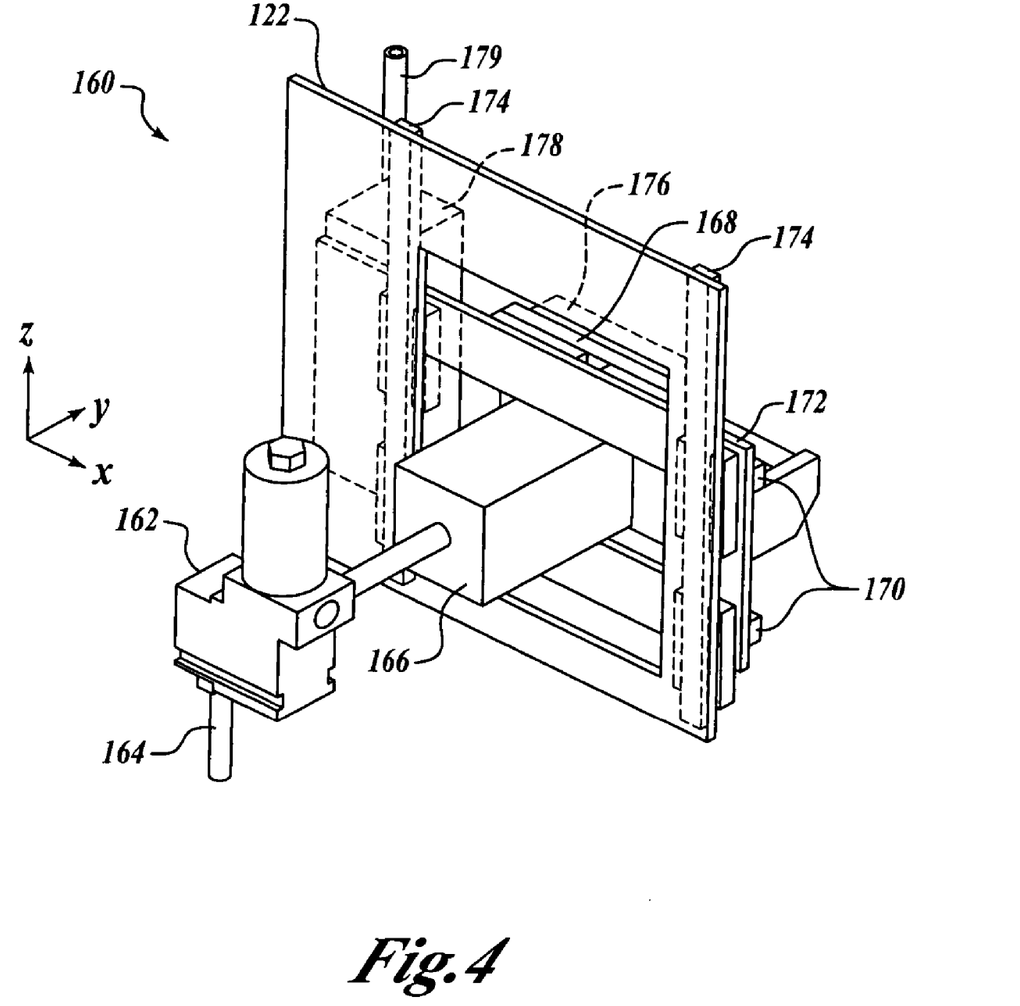
FIG. 4 is an enlarged, front isometric view of the opposing-force support assembly of the manufacturing assembly of FIG. 1.
Figure 5:
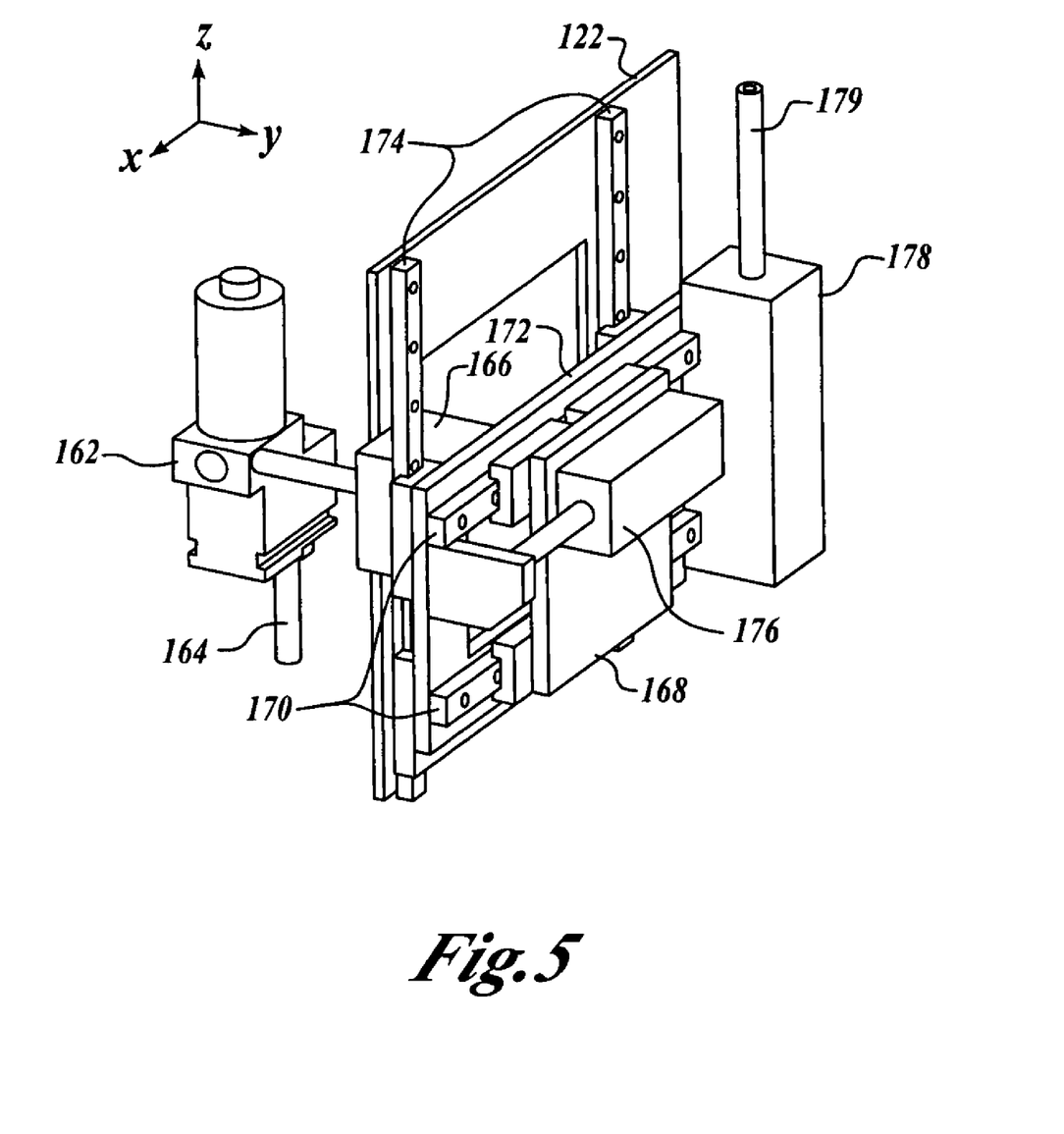
FIG. 5 is an enlarged, rear isometric view of the opposing-force support assembly of the manufacturing assembly of FIG. 1.

FIGS. 4 and 5 are enlarged, front and rear isometric views, respectively, of the opposing-force support assembly 160 of the manufacturing assembly 100 of FIG. 1. In this embodiment, the opposing-force support assembly 160 includes a clamp-up actuator 162 having a clamp-up pin 164 that is engageable with the workpiece 102. A first (or y-axis) actuator 166 is coupled to the clamp-up actuator 162 and to a first baseplate 168, and is extendible along the y-axis. The first baseplate 168 is slideably coupled to a pair of first auxiliary rails 170 mounted on a second baseplate 172. Similarly, the second baseplate 172 is slideably coupled to second auxiliary rails 174 mounted on the x-axis carriage 122. As best shown in FIG. 5, the first auxiliary rails 170 are approximately parallel with the x-axis, and the second auxiliary rails 174 are approximately parallel with the z-axis. A second (or x-axis) actuator 176 is coupled between the first baseplate 168 and the second baseplate 172, and is extendible along the x-axis. A third (or z-axis) actuator 178 is coupled between the second baseplate 172 and to the x-axis carriage 122, and is extendible along the z-axis. The first, second, and third actuators 166, 176, 178 may be operatively coupled to the controller 134. Thus, the first, second, and third actuators 166, 176, 178 may be used to controllably position the clamp-up pin 164 of the opposing-force support assembly 160 at a desired location along the y-axis, the x-axis, and the z-axis, respectively.

It will be appreciated that the clamp-up actuator 162 may be any type of suitable actuator, including a hydraulic, pneumatic, or electrically-driven actuator. Similarly, the first, second and third actuators 166, 176, 178 may be hydraulic, pneumatic, electric, or any other suitable type of actuators. In one particular embodiment, the first, second and third actuators 166, 176, 178 are so-called "return to home" pneumatic actuators that are coupled by one or more pneumatic supply lines 179 (FIGS. 4 and 5) to a source of pressurized air (not shown).

In operation, the manufacturing assembly 100 may be mounted onto the workpiece 102 and vacuum may be provided to the vacuum assemblies 114, thereby securing the track assembly 110 in a desired position. A hole 103 may be formed in the workpiece 102 in any desired manner, such as during fabrication of the workpiece 102, or using the tool assembly 150 or another drilling device. Next, the clamp-up pin 164 may be positioned in the hole 103. The positioning of the clamp-up pin 164 into the hole 103 may be accomplished in a variety of ways. For example, the position of the clamp-up pin 164 along the x-axis may be accomplished by controllably positioning the x-axis carriage 122 using the first drive motor 130, or controllably positioning the first baseplate 168 along the first auxiliary rails 170 using the second actuator 176, or by a combination of both of these methods. Similarly, the position of the clamp-up pin 164 along the y-axis may be accomplished by controllably positioning the y-axis carriage 124 using the second drive motor 140, or by controllably actuating the first actuator 166, or both. Finally, the position of the clamp-up pin 164 along the z-axis may be accomplished by controllably positioning the second baseplate 172 along the second auxiliary rails 174 using the third actuator 178. In one particular embodiment, the x-axis and y-axis carriages 122, 124 are employed to perform coarse, relatively large scale positioning, and the second and first actuators 176, 166 are used to provide finer, relatively small scale positioning of the clamp-up pin 164 along the x- and y-axes, respectively.

The above-described positioning of the opposing-force support assembly 160 may be accomplished in an automated or semi-automated manner using the controller 134 equipped with conventional, computerized numerically-controlled (CNC) methods and algorithms. Alternately, the positioning may be performed manually by an operator, such as, for example, by temporarily disabling or neutralizing the above-referenced motors and actuators of the carriage and clamp-up assemblies 120, 160 to permit the opposing-force support assembly 160 to be positioned manually.

With further reference to FIGS. 1–5, after the clamp-up pin 164 is positioned within the hole 103, the clamp-up actuator 162 may be actuated to securely engage the clamp-up pin 164 within the hole 103, thereby fixing the position of the opposing-force support assembly 160 with respect to the workpiece 102. After the clamp-up assembly 160 is securely engaged with the workpiece 102, the tool assembly 150 may be used to perform manufacturing operations on the workpiece 102. Specifically, in the embodiment shown in FIGS. 1–3, the drill spindle module 152 may be operated to drill one or more additional holes 103 into the workpiece 102. For example, the additional holes 103 may be created by controllably positioning the tool assembly 150 using the carriage assembly 120 in an automated or semi-automated manner using the controller 134 and conventional CNC methods and algorithms. Because the opposing-force support assembly 160 is moveably secured to the carriage assembly 120, the carriage assembly 120 may be used to re-position the tool assembly 150 without detaching the opposing-force support assembly 160 from the workpiece 102. Thus, with the opposing-force support assembly 160 secured to the workpiece 102, the tool assembly 150 may be successively and repeatedly repositioned at a plurality of desired locations on the workpiece 102 to perform manufacturing operations.

After one or more manufacturing operations have been performed on the workpiece 102, the opposing-force support assembly 160 may be detached from the workpiece 102 by deactivating the clamp-up actuator 162 and removing the clamp-up pin 164 from the hole 103. If desired, the opposing-force support assembly 160 may then be repositioned to a new location and may be secured again to the workpiece 102 by inserting the clamp-up pin 164 into a different hole 103 (such as one of the newly formed holes) and actuating the opposing-force support assembly 160 in the manner described above. With the opposing-force support assembly 160 secured to the workpiece 102 in the new location, additional manufacturing operations may be conducted on the workpiece 102 as desired.

Manufacturing assemblies having opposing support systems in accordance with the teachings of the present invention may advantageously improve the quality of manufacturing operations on a workpiece. Because the opposing-force support assembly 160 opposingly supports (or counterbalances) the workpiece during the application of forces on the workpiece by the tool assembly 150, the workpiece 102 may be less likely to bend or deflect during the manufacturing process, especially for relatively thin or relatively flexible workpieces. Since deflections of the workpiece 102 may be reduced or eliminated, the orientation of the tool assembly 150 with respect to the workpiece 102 may be more easily maintained by the carriage assembly 120. Thus, the manufacturing operations may be more accurately and consistently conducted using the manufacturing assembly 100. Because the manufacturing operations may be more accurately and consistently performed, the costs associated with inspecting and reworking the workpiece 102 during the manufacturing operation may be reduced.

The manufacturing assembly 100 having the opposing-force support assembly 160 may also improve the speed with which manufacturing operations may be performed. Because the opposing-force support assembly 160 provides opposing support to the workpiece 102 during manufacturing operations, the tool assembly 150 may be more forcefully applied to the workpiece 102. In this way, the speed with which the manufacturing operations are performed may be increased, and the efficiency and throughput of the manufacturing operations may be improved.

It will be appreciated that a wide variety of suitable embodiments of opposing support assemblies 160 may be conceived in accordance with the teachings of the present invention. For example, a variety of clamp-up pins 164 and clamp-up actuators 162 are known that may be employed to secure the opposing-force support assembly 160 to the workpiece 102, including, for example, a collet device of the type generally disclosed in U.S. Pat. No. 4,396,318 issued to Jensen et al., U.S. Pat. No. 5,395,187 issued to Slesinski et al., and U.S. Pat. No. 6,036,409 issued to Rissler, or a clamping device of the type generally disclosed in U.S. Pat. No. 5,482,411 issued to McGlasson and U.S. Pat. No. 6,283,684 B1 issued to Jarvis. In one alternate embodiment, the hole 103 may be a threaded hole 103, and the clamp-up pin 164 may be a threaded member that threadedly engages the threaded hole 103. In further embodiments, the clamp-up pin 164 and clamp-up actuator 162 may be replaced with any other suitable securing devices, including one or more of the above-referenced vacuum cup assemblies 114, magnets, or other electro-magnetic apparatus, such as, for example, an apparatus that exerts a force on a workpiece in a manner similar to the electromagnetic dent remover apparatus commercially-available from Electroimpact, Inc. of Everett, Wash.

It may also be appreciated that manufacturing assemblies in accordance with the present invention, including the particular embodiment of the manufacturing assembly 100 described above, may be used to provide opposing support to a wide variety of manufacturing tools, and that the teachings of the present invention are not limited simply to manufacturing operations that involve drilling. For example, manufacturing assemblies having opposing support assemblies in accordance with the present invention may be used to support riveters, mechanical and electromagnetic dent pullers, welders, wrenches, clamps, sanders, nailers, screw guns, or virtually any other desired type of manufacturing tools or measuring instruments.

It may also be appreciated that a variety of alternate embodiments of apparatus and methods may be conceived in accordance with the present invention, and that the invention is not limited to the particular apparatus and methods described above and shown in the accompanying figures. For example, it may be noted that the carriage assembly 120 and the track assembly 110 may assume a wide variety of alternate embodiments. For example, in one embodiment, the opposing-force support assembly 160 may be coupled to the rail and carriage assembly taught by U.S. Pat. No. 4,850,763 issued to Jack et al. In yet another embodiment, the opposing-force support assembly 160 may be used in combination with any of the carriage assemblies and track assemblies disclosed in co-pending, commonly owned U.S. patent application Ser. No. 10/016,524, which application is incorporated herein by reference.

Figure 6:
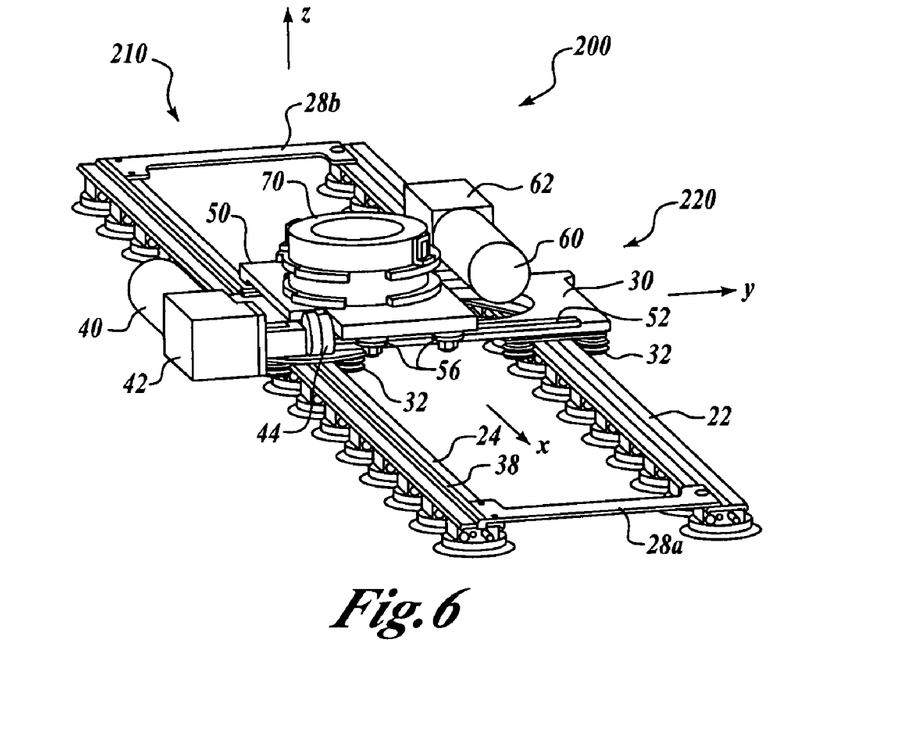
FIG. 6 is an upper isometric view of a track assembly and a carriage assembly for in accordance with an alternate embodiment of the invention.
Figure 7:
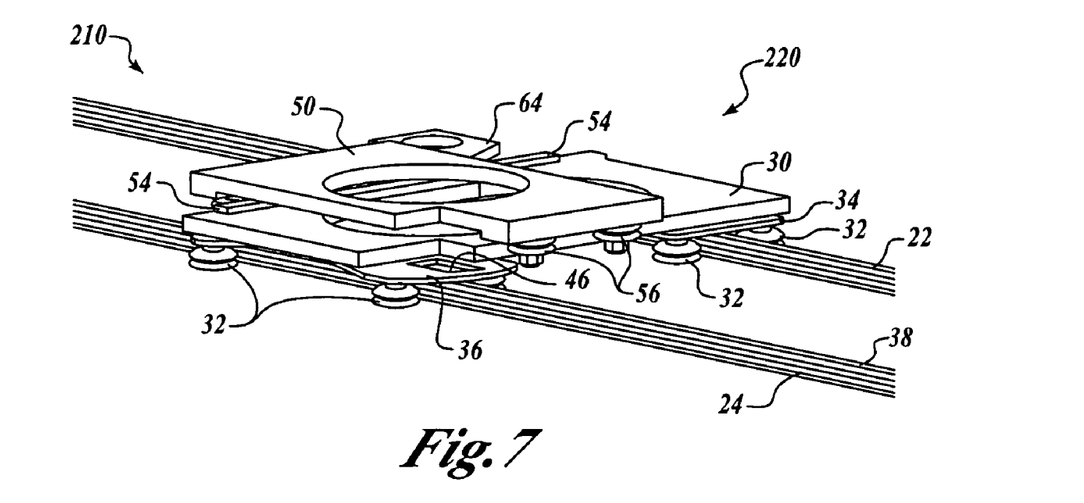
FIG. 7 is another upper isometric view of the track assembly and a portion of the carriage assembly of FIG. 6.
Figure 8:
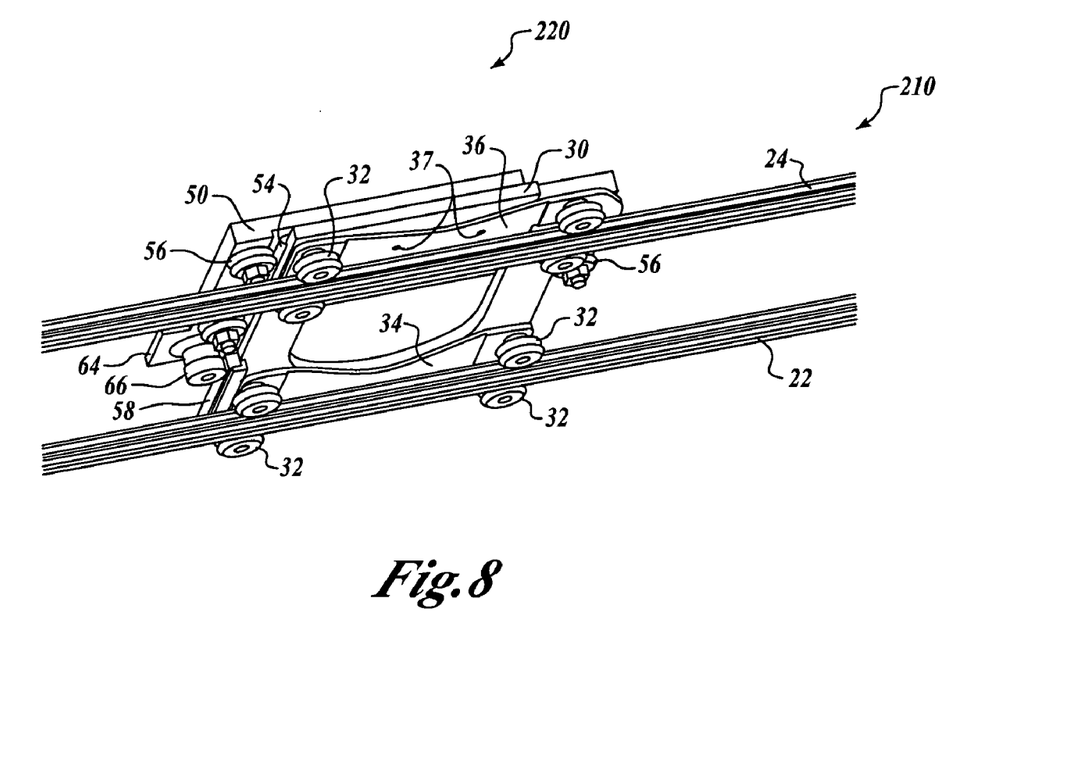
FIG. 8 is a lower isometric view of the track assembly and a portion of the carriage assembly of FIG. 6.

Specifically, FIG. 6 is an upper isometric view of a track assembly 210 and a carriage assembly 220 that may be used in a manufacturing assembly having an opposing-force support assembly 160 in accordance with an alternate embodiment of the invention. FIGS. 7 and 8 are upper and lower isometric partial views, respectively, of the track assembly 210 and the carriage assembly 220 of FIG. 6. As shown in FIGS. 6–8, the track assembly 210 includes a pair of rails 22, 24 to which a plurality of attachment devices, preferably in the form of vacuum cup assemblies 114 (FIGS. 1–3) are releasably affixed at spaced intervals along the length of each rail. The rails 22, 24 preferably have a width substantially greater than their thickness such that they are substantially stiffer in bending about an axis that extends in the thickness direction than they are about an axis that extends in the width direction. The rails 22, 24 are oriented approximately parallel to each other, although the lateral spacing between the rails 22, 24 can vary when the rails 22, 24 are mounted on a compound-contoured workpiece surface. Preferably, the rails 22, 24 are rigidly affixed to each other at only one end by a connecting member 28*a*, which fixes the lateral spacing between the rails at that end. At other locations along the rails 22, 24, the spacing between the rails 22, 24 can vary as noted. There can be another connecting member 28*b* at the opposite end of the rails 22, 24, but this connecting member 28*b* may provide a "floating" connection that allows the spacing between the rails 22, 24 to adjust as needed depending on the contour of the workpiece 102 surface.

The widths of the rails 22, 24 extend substantially parallel to the surface of the workpiece 102 when the vacuum cup assemblies 114 are attached to the workpiece surface 102. Because the rails 22, 24 may bend relatively easily about the widthwise directions and to twist about their longitudinal axes, the rails 22, 24 may flex and twist as needed to substantially follow the surface of the workpiece 102 and the vacuum cup assemblies 114 maintain each rail at a substantially constant distance from the surface of the workpiece 102. In this manner, the major surfaces of the rails 22, 24 may be substantially perpendicular to the surface normal of the workpiece 102 at any point along each rail.

With continued reference to FIGS. 6–8, mounted on the rails 22, 24 is a carriage assembly 220 that may translate along the rails 22, 24 by virtue of rollers 32 that are mounted on an x-axis carriage 30 of the carriage 220 and engage the rails 22, 24. The x-axis carriage 30 of the carriage assembly 220 in the illustrated embodiment comprises a plate-shaped member. The rollers 32 are mounted along each of the opposite side edges of the x-axis carriage 30. More particularly, spring plates 34 and 36 (best shown in FIG. 8) are attached to the x-axis carriage 30 adjacent to a lower surface thereof at each of the opposite side edges of the x-axis carriage 30. The spring plates 34, 36 are affixed to the x-axis carriage 30 at locations 37 (FIG. 8) spaced inwardly from the opposite ends of the spring plates 34, 36, such that each spring plate has two opposite end portions that are cantilevered from the x-axis carriage 30. The rollers 32 are mounted on these cantilevered end portions of the spring plates 34, 36. There are two opposing rollers 32 mounted on each cantilevered end portion of each of the spring plates 34, 36. Each rail 22, 24 is received between the opposing rollers 32. The rails 22, 24 preferably have V-shaped edges engaged by the rollers 32, and the rollers 32 are V-groove rollers having V-shaped grooves that receive the V-shaped edges of the rails 22, 24. The rollers 32 thus prevent relative movement between the rollers 32 and rails 22, 24 in the direction along the rotational axes of the rollers 32, which axes are substantially normal to the workpiece surface 102.

The spring plates 34, 36 on which the rollers 32 are mounted may flex and twist as needed (i.e. as dictated by the contour of the workpiece surface 102 as the carriage assembly 220 traverses the rails 22, 24) to allow a limited degree of relative movement to occur between the x-axis carriage 30 and the rollers 32. This is facilitated by making the spring plates 34, 36 relatively narrow at their middles and wider at their ends, so that the plates 34, 36 preferentially bend and twist at approximately the middle rather than at the ends where the rollers 32 are mounted. Thus, a limited degree of relative movement can occur between the x-axis carriage 30 and the rails 22, 24. The net result is that the x-axis carriage 30 enables the carriage assembly 220 to traverse the rails 22, 24 along the x-axis (i.e. the axis parallel to the length direction of the rails 22, 24) even though the rails 22, 24 may be bending and twisting in somewhat different ways relative to each other. In effect, the rails 22, 24 conform to the contour of the workpiece 102 and thus approximate a normal to the surface at any point along the path defined by the rails 22, 24. Consequently, a reference axis of the carriage assembly 220 (in the illustrated embodiment, a z-axis normal to the plane of the x-axis carriage 30) is maintained substantially normal to the workpiece 102 at any position of the carriage assembly 220 along the rails 22, 24.

As best shown in FIG. 6, a rack 38 for a rack and pinion arrangement is mounted along the surface of the rail 24 that faces the spring plate 36, and the carriage assembly 220 includes a first motor 40 and associated gearbox 42 mounted on the spring plate 36. An output shaft from the gearbox 42 has a pinion gear 44 mounted thereon, and the spring plate 36 includes a window 46 (FIG. 7) that the pinion gear 44 extends through to engage the rack 38 on the rail 24. Thus, rotation of the pinion gear 44 by the first motor 40 drives the carriage assembly 220 along the rails 22, 24. It may be appreciated that the rail 24 having the rack 38 comprises a reference rail relative to which the x-axis positioning of the carriage assembly 220 may be performed. No attempt is necessary to determine or control the x-axis positioning of the carriage assembly 220 relative to the other rail 22.

To improve accuracy of the x-axis position of the carriage assembly 220, the pinion gear 44 may have a constant height relative to the rack 38 at any point along the reference rail 24. To accomplish this height control, the rotation axis of the pinion gear 44 may preferably lie in the same plane as that defined by the rotational axes of the two rollers 32 mounted on the end of the spring plate 36. More particularly, the axes of the rollers 32 may be substantially parallel to each other and substantially normal to the workpiece surface 102, and the axis of the pinion gear 44 may be substantially parallel to the workpiece surface 102 and may lie in the plane of the roller axes.

As further shown in FIGS. 6–8, the carriage assembly 220 further includes a y-axis carriage 50 slideably mounted atop the x-axis carriage 30 so that the y-axis carriage 50 can slide back and forth along a y-axis direction perpendicular to the x-axis direction. More particularly, rails 52, 54 are affixed to the opposite edges of the x-axis carriage 30, and rollers 56 are mounted on the y-axis carriage 50 for engaging the rails 52, 54. A rack 58 for a rack and pinion arrangement is affixed to the x-axis carriage 30 along the edge thereof adjacent to the rail 54 (see FIG. 7). A second motor 60 and associated second gearbox 62 are mounted on a plate 64 that is affixed to the y-axis carriage 50 adjacent to the rack 58. The plate 64 includes a window therethrough, and the output shaft of the second gearbox 62 extends through the window and drives a pinion gear 66 that engages the rack 58. Thus, rotation of the pinion gear 66 by the second motor 60 drives the second base member along the rails 52, 54 in the y-axis direction.

As shown in FIG. 6, mounted atop the y-axis carriage is a clamp ring assembly 70. The clamp ring assembly 70 may be used to support and secure a tool assembly 150, such as the drill spindle module 152 described above. The tool assembly 150 may be extended through a window in the y-axis carriage 50 (visible in FIG. 7), and through a window in the x-axis carriage 30 (visible in FIG. 8) that is elongated in the y-axis direction. The axis of the tool assembly 150 may be approximately parallel to the z-axis, and thus may be substantially normal to the workpiece 102.

In operation, the opposing-force support assembly 160 described above with reference to FIGS. 1–5 may be coupled to the carriage assembly 220 shown in FIGS. 6–8 in any suitable manner, and a manufacturing tool assembly 150 may be coupled to the carriage assembly 220 (e.g., to the clamp ring assembly 70). Manufacturing operations may then be performed substantially in accordance with the procedures and methods described above. Movement of the carriage assembly 220 along the x-axis may be provided by a combination of force applied by the operator 104 and/or by the first motor 40. Similarly, positioning of the manufacturing tool along the y-axis may be provided by a combination of force applied by the operation 104 and/or the second motor 60. In further embodiments, gross positioning of the manufacturing tool may be provided by the first and second motors 40, 60, and fine positioning may be provided by the operator 104, or vice versa. Thus, the above-described advantages may be achieved using alternate embodiments of track assemblies and carriage assemblies to create additional embodiments of manufacturing assemblies in accordance with the teachings of the present invention.

While specific embodiments of the invention have been illustrated and described herein, as noted above, many changes can be made without departing from the spirit and scope of the invention. Accordingly, the scope of the invention should not be limited by the disclosure of the specific embodiments set forth above. Instead, the invention should be determined entirely by reference to the claims that follow.

What is claimed is:

1. An apparatus for supporting a manufacturing tool relative to a workpiece, the apparatus comprising:
    a track assembly adapted to be attached to the workpiece;
    a carriage moveably coupled to the track assembly and moveable relative to the workpiece along a translation axis, the carriage including a tool support configured to receive and support a manufacturing tool; and
    an opposing-force support assembly operatively coupled to the carriage and configured to be controllably secured to the workpiece to at least partially counterbalance a manufacturing force exerted on the workpiece by the manufacturing tool, wherein the track assembly includes a vacuum cup assembly configured to secure to a surface of the workpiece, and wherein the opposing-force support assembly includes:
    a first member moveably coupled to the carriage and moveable alone a first axis;
    a first actuator coupled to the first member and to the carriage and configured to move the first member along the first axis;
    a second member moveably coupled to the first member and moveable along a second axis orthogonally oriented with respect to the first axis;
    a second actuator coupled to the second member and to the first member and configured to move the second member alone the second axis; and
    a securing device coupled to the second member and configured to be secured to the workpiece.

2. The apparatus of claim 1, wherein the opposing-force support assembly includes a clamp-up pin configured to engage a hole in the workpiece, and a clamp-up actuator operatively coupled to the clamp-up pin and configured to actuate the clamp-up pin into secure engagement with the workpiece.

3. The apparatus of claim 1, wherein the opposing-force support assembly includes a threaded pin configured to threadedly engage a threaded hole in the workpiece.

4. An apparatus for supporting a manufacturing tool relative to a workpiece, the apparatus comprising:
    a track assembly to be attached to the workpiece;
    a carriage moveably coupled to the track assembly and moveable relative to the workpiece along a translation axis, the carriage including a tool support to receive and support a manufacturing tool; and
    an opposing-force support assembly operatively coupled to the carriage and configured to be secured to the workpiece to at least partially counterbalance a manufacturing force exerted on the workpiece by the manufacturing tool, wherein the opposing-force support assembly includes:
    a first member moveably coupled to the carriage and moveable along a first axis;
    a first actuator coupled to the first member and to the carriage and configured to move the first member along the first axis;
    a second member moveably coupled to the first member and moveable along a second axis orthogonally oriented with respect to the first axis;
    a second actuator coupled to the second member and to the first member and configured to move the second member along the second axis; and
    a securing device coupled to the second member and configured to be secured to the workpiece.

5. The apparatus of claim 4, wherein the securing device is coupled to the second member by a third actuator, the third actuator being configured to move the securing device along a third axis orthogonally oriented to the first and second axes.

6. The apparatus of claim 5, wherein the second axis is approximately parallel with the translation axis of the carriage, and wherein the first axis is configured to be approximately parallel with a longitudinal axis of the manufacturing tool.

7. The apparatus of claim 6, wherein the first member is moveably coupled to a pair of elongated members on the carriage, the elongated members being configured to be approximately parallel with a longitudinal axis of the manufacturing tool.

8. The apparatus of claim 6, wherein the second member is moveably coupled to a pair of elongated members on the first member, the elongated members being configured to be approximately parallel with the translation axis of the carriage.

9. The apparatus of claim 1, wherein the track assembly includes at least one rail, and wherein the carriage is rollably coupled to the rail.

10. The apparatus of claim 1, wherein the carriage includes an x-axis portion moveably coupled to the track assembly, and a y-axis portion moveably coupled to the x-axis portion and moveable with respect to the x-axis portion along a y-axis oriented transversely to the translation axis.

11. The apparatus of claim 1, wherein the carriage includes a drive assembly having a drive motor operatively engaging the track assembly and configured to drive the carriage along the track assembly.

12. An assembly for performing a manufacturing operation on a workpiece, the assembly comprising:
   a track assembly configured to be attached to the workpiece;
   a carriage moveably coupled to the track assembly and moveable relative to the workpiece along a translation axis, the carriage including a tool support configured to receive and support a manufacturing tool;
   a manufacturing tool coupled to the tool support and configured to be engageable with the workpiece to perform the manufacturing operation on the workpiece; and
   an opposing-force support assembly operatively coupled to the carriage and configured to be secured to the workpiece to at least partially counterbalance a manufacturing force exerted on the workpiece by the manufacturing tool, wherein the track assembly includes a vacuum cup assembly configured to secure to a surface of the workpiece, wherein the opposing-force support assembly includes:
   a first member moveably coupled to the carriage and moveable along a first axis;
   a first actuator coupled to the first member and to the carriage and configured to move the first member along the first axis;
   a second member moveably coupled to the first member and moveable along a second axis orthogonally oriented with respect to the first axis;
   a second actuator coupled to the second member and to the first member and configured to move the second member along the second axis; and
   a securing device coupled to the second member and configured to be secured to the workpiece.

13. The assembly of claim 12, wherein the opposing-force support assembly includes a clamp-up pin configured to engage a hole in the workpiece, and a clamp-up actuator operatively coupled to the clamp-up pin and configured to actuate the clamp-up pin into secure engagement with the workpiece.

14. The assembly of claim 12, wherein the opposing-force support assembly includes a threaded pin configured to threadedly engage a threaded hole in the workpiece.

15. An assembly for performing a manufacturing operation on a workpiece, the assembly comprising:
   a track assembly configured to be attached to the workpiece;
   a carriage moveably coupled to the track assembly and moveable relative to the workpiece along a translation axis, the carriage including a tool support configured to receive and support a manufacturing tool;
   a manufacturing tool coupled to the tool support and configured to be engageable with the workpiece to perform the manufacturing operation on the workpiece; and
   an opposing-force support assembly operatively coupled to the carriage and configured to be secured to the workpiece to at least partially counterbalance a manufacturing force exerted on the workpiece by the manufacturing tool, wherein the opposing-force support assembly includes:
   a first member moveably coupled to the carriage and moveable along a first axis;
   a first actuator coupled to the first member and to the carriage and configured to move the first member along the first axis;
   a second member moveably coupled to the first member and moveable along a second axis orthogonally oriented with respect to the first axis;
   a second actuator coupled to the second member and to the first member and configured to move the second member along the second axis; and
   a securing device coupled to the second member and configured to be secured to the workpiece.

16. The assembly of claim 15, wherein the securing device is coupled to the second member by a third actuator, the third actuator being configured to move the securing device along a third axis orthogonally oriented to the first and second axes.

17. The assembly of claim 16, wherein the second axis is approximately parallel with the translation axis of the carriage, and wherein the first axis is configured to be approximately parallel with a longitudinal axis of the manufacturing tool.

18. The assembly of claim 17, wherein the first member is moveably coupled to a pair of elongated members on the carriage, the elongated members being configured to be approximately parallel with a longitudinal axis of the manufacturing tool.

19. The assembly of claim 17, wherein the second member is moveably coupled to a pair of elongated members on the first member, the elongated members being configured to be approximately parallel with the translation axis of the carriage.

20. The assembly of claim 12, wherein the track assembly includes at least one rail, and wherein the carriage is rollably coupled to the rail.

21. The assembly of claim 12, wherein the carriage includes an x-axis portion moveably coupled to the track assembly, and a y-axis portion moveably coupled to the x-axis portion and moveable with respect to the x-axis portion along a y-axis oriented transversely to the translation axis.

22. The assembly of claim 12, wherein the carriage includes a drive assembly having a drive motor operatively engaging the track assembly and configured to drive the carriage along the track assembly.

23. The assembly of claim 12, wherein the manufacturing tool includes a drill and the manufacturing operation includes a drilling operation.

24. A method of performing a manufacturing operation on a workpiece, the method comprising:
   moveably supporting a manufacturing assembly proximate a surface of the workpiece, the manufacturing assembly including a manufacturing tool and an opposing-force support assembly, the manufacturing assembly being moveable along a translation direction that is at least partially along a direction perpendicular to a local normal to a surface of the workpiece, wherein moveably supporting a manufacturing assembly includes applying a vacuum pressure to a surface of the workpiece, and wherein the opposing-force support assembly includes:
- a first member moveably coupled to the carriage and moveable along a first axis;
- a first actuator coupled to the first member and to the carriage and configured to move the first member along the first axis;
- a second member moveably coupled to the first member and moveable along a second axis orthogonally oriented with respect to the first axis;
- a second actuator coupled to the second member and to the first member and configured to move the second member along the second axis; and
- a securing device coupled to the second member and configured to be secured to the workpiece;

applying a manufacturing force against the workpiece using the manufacturing tool, the manufacturing force being at least partially along the local normal; and simultaneously with applying the manufacturing force against the workpiece, applying an opposing force against the workpiece using the opposing-force support assembly, the opposing force being in a direction substantially parallel with and opposite to the manufacturing force.

25. The method of claim 24, wherein moveably supporting a manufacturing assembly proximate a surface of the workpiece includes slideably supporting the manufacturing assembly on a rail positioned proximate the surface of the workpiece.

26. The method of claim 24, wherein applying an opposing force against the workpiece includes inserting a clamp-up pin into a hole in the workpiece and actuating a clamp-up actuator operatively coupled to the clamp-up pin.

27. The method of claim 24, wherein applying an opposing force against the workpiece includes inserting a threaded member into a threaded hole in the workpiece and actuating an actuator operatively coupled to the threaded member.

28. The method of claim 24, wherein applying an opposing force against the workpiece includes applying an opposing force that at least approximately counterbalances the manufacturing force.

29. The method of claim 24, further comprising moving the manufacturing tool along the translation direction simultaneously with applying the opposing force against the workpiece using the opposing-force support assembly.

30. The method of claim 24, further comprising performing the manufacturing operation on the workpiece using the manufacturing tool.

31. The method of claim 30, wherein the manufacturing tool includes a drill and the manufacturing operation includes a drilling operation.

32. An apparatus for supporting a manufacturing tool relative to a workpiece, the apparatus comprising:
- a track assembly configured to be attached to the workpiece;
- a carriage moveably coupled to the track assembly and moveable relative to the workpiece along a translation axis, the carriage including a tool support configured to receive and support a manufacturing tool; and
- an opposing-force support assembly operatively coupled to the carriage and configured to be secured to the workpiece to at least partially counterbalance a manufacturing force exerted on the workpiece by the manufacturing tool, wherein at least one of the carriage and the tool support are moveable relative to the opposing-force support assembly such that a manufacturing operation may be performed at a plurality of location on the workpiece relative to the opposing-force support assembly when the opposing-force support assembly is secured at a single support location to the workpiece, and wherein the opposing-force support assembly includes:
  - a first member moveably coupled to the carriage and moveable along a first axis;
  - a first actuator coupled to the first member and to the carriage and configured to move the first member along the first axis;
  - a second member moveably coupled to the first member and moveable along a second axis orthogonally oriented with respect to the first axis;
  - a second actuator coupled to the second member and to the first member and configured to move the second member along the second axis; and
  - a securing device coupled to the second member and configured to be secured to the workpiece.

33. The apparatus of claim 32, wherein the opposing-force support assembly includes at least one of a clamp-up pin configured to engage a hole in the workpiece, a clamp-up pin actuator operatively coupled to the clamp-up pin and configured to actuate the clamp-up pin into secure engagement with the workpiece, and a threaded pin configured to threadedly engage a threaded hole in the workpiece.

34. The apparatus of claim 32, wherein the track assembly includes at least one rail, and wherein the carriage is rollably coupled to the rail.

35. The apparatus of claim 32, wherein the carriage includes an x-axis portion moveably coupled to the track assembly, and a y-axis portion moveably coupled to the x-axis portion and moveable with respect to the x-axis portion along a y-axis oriented transversely to the translation axis.

36. A method of performing a manufacturing operation on a workpiece, the method comprising:
moveably supporting a manufacturing assembly proximate a surface of the workpiece, the manufacturing assembly including a manufacturing tool and an opposing-force support assembly, the manufacturing assembly being moveable along a translation direction that is at least partially along a direction perpendicular to a local normal to a surface of the workpiece, the manufacturing assembly being further configured such that the manufacturing tool is moveable relative to the opposing-force support assembly such that a manufacturing operation may be performed at a plurality of locations on the workpiece relative to the opposing-force support assembly when the opposing-force support assembly is secured to the workpiece, and wherein the opposing-force support assembly includes:
- a first member moveably coupled to the carriage and moveable along a first axis;
- a first actuator coupled to the first member and to the carriage and configured to move the first member along the first axis;
- a second member moveably coupled to the first member and moveable along a second axis orthogonally oriented with respect to the first axis;
- a second actuator coupled to the second member and to the first member and configured to move the second member along the second axis; and a securing device coupled to the second member and configured to be secured to the workpiece;

applying an opposing force against the workpiece using the opposing-force support assembly at a support location, the opposing force being in a direction substantially parallel with an opposite to the manufacturing force; and simultaneously with applying the opposing force against the workpiece, successively applying a manufacturing force against the workpiece using the manufacturing tool at a plurality of positions relative to the support location, the manufacturing force being at least partially along the local normal.

37. The method of claim 36, wherein moveably supporting a manufacturing assembly proximate a surface of the workpiece includes slideably supporting the manufacturing assembly on a rail positioned proximate the surface of the workpiece.

38. The method of claim 36, wherein applying an opposing force against the workpiece includes applying an opposing force that at least approximately counterbalances the manufacturing force.

* * * * *